(No Model.)
E. P. SCHOENFELDER & E. KEHLE.
PANORAMIC CAMERA.
No. 575,431. Patented Jan. 19, 1897.
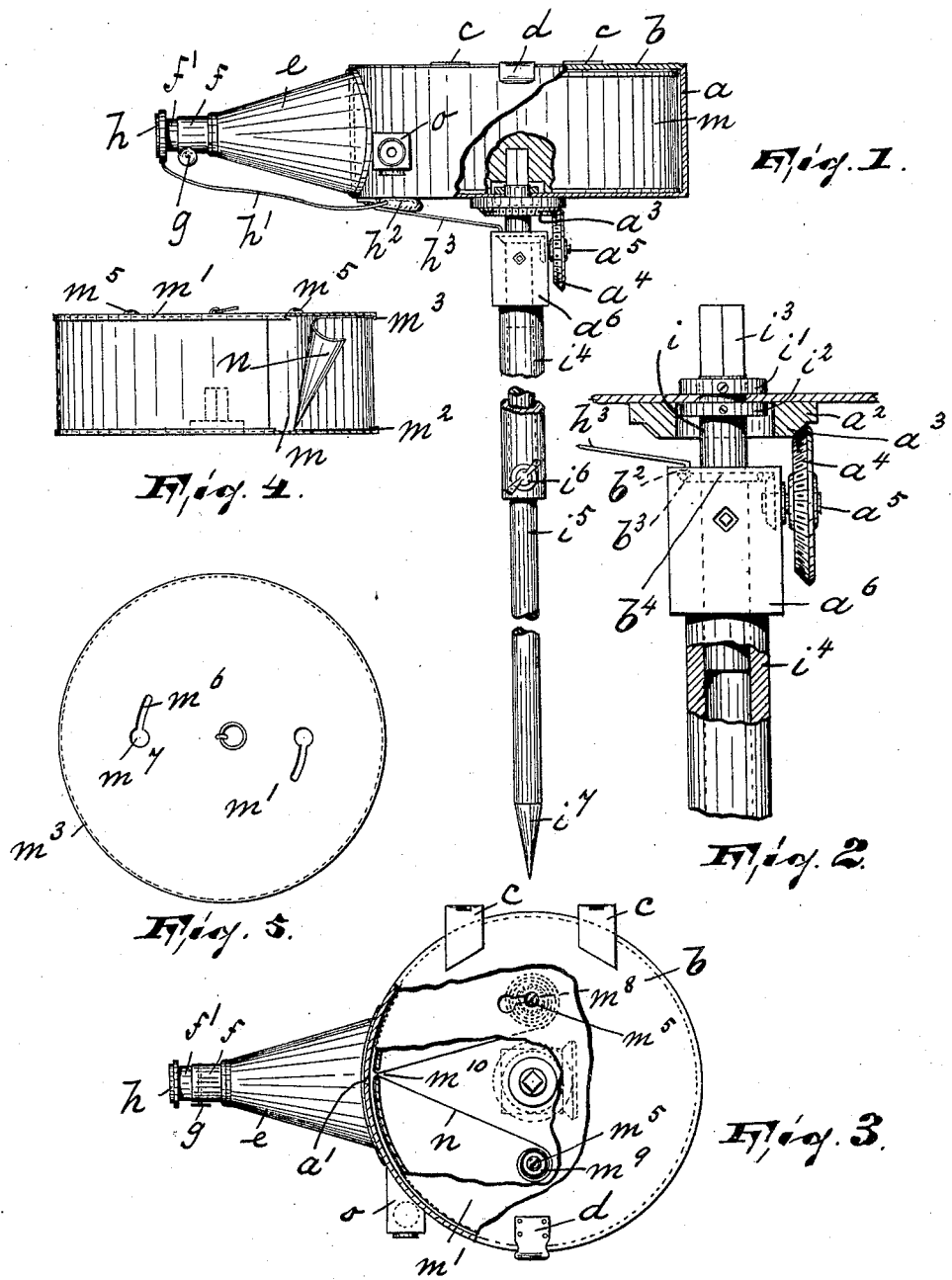
WITNESSES:
INVENTORS:
Emil Paul Schoenfelder and
Emil Kehle
BY Gartner &co
ATTORNEYS.

United States Patent Office.

EMIL PAUL SCHOENFELDER AND EMIL KEHLE, OF NEWARK, NEW JERSEY.

PANORAMIC CAMERA.

SPECIFICATION forming part of Letters Patent No. 575,431, dated January 19, 1897.

Application filed July 29, 1896. Serial No. 600,974. (No model.)

*To all whom it may concern:*

Be it known that we, EMIL PAUL SCHOENFELDER and EMIL KEHLE, citizens of the United States, residing in Newark, county of Essex, and State of New Jersey, have invented certain new and useful Improvements in Cameras; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this present invention is to provide a camera, for the purpose of taking panoramic pictures, of simple, strong, and durable construction, reliable in operation, and easily handled.

The invention consists in the improved camera, its revolving "lens-carrier," in the means for operating the carrier and simultaneously controlling the shutter of the lens, and in the combination and arrangement of the various parts, substantially as will be hereinafter more fully described and finally embodied in the clauses of the claim.

In the accompanying drawings, Figure 1 is a side elevation of the improved camera, certain portions being broken away and others being shown in section to better illustrate the nature of the said invention; Fig. 2, an enlarged detail view of the carrier's operating and shutter-controlling mechanism; Fig. 3, a top plan view of Fig. 1 with certain portions broken away and also illustrating the arrangement of the film for the purpose of taking a number of panoramic pictures in succession without the necessity of reloading; Fig. 4, a detail view of the film-carrying cylinder, and Fig. 5 a top plan view of the lid used in connection with said cylinder.

In said drawings, $a$ represents a cylindrical casing, and $b$ the lid hinged thereto, as at $c$, and provided with a lock $d$ of any desired construction.

The casing $a$ is provided at one side with a vertically-arranged narrow slot $a'$ (see Fig. 3) and a tapering funnel $e$, projecting horizontally from said casing and surrounding the slot $a'$.

The outer end of the funnel terminates into a tube $f$, in which the lens-holder $f'$ is adjustably arranged by means of the screw $g$, as will be manifest. On the lens-holder $f'$ is secured in any desired manner the "pneumatic" shutter $h$, connected through the elastic tube $h'$ with the elastic ball $h^2$, arranged on the under side of the casing $a$ and held in position by the flat spring $h^3$, secured with one end to the casing and having its other end controlled by means hereinafter specified.

The casing $a$ is provided at its under side with a central circular opening penetrated by the circular stem or rod $i$, on which said casing is adapted to be revolved, and is prevented from a vertical motion by means of the collars $i'$ and $i^2$, secured to the rod $i$ above and below the bottom of the casing, as clearly shown in Fig. 2.

On the rod $i$, which projects from the tube $i^4$, is secured in any desired manner the casing $a^6$, in which is arranged a clock-movement or spring-motor of suitable construction. (Not shown in detail in the drawings.) Said spring-motor operates the shaft $a^5$, projecting horizontally through the casing $a^6$, and carrying the beveled gear $a^4$, meshing into the beveled gear $a^3$, which latter is secured to or made integral with the annular flange $a^2$, arranged on and fixed to the under side of the casing $a$.

A wheel $b^4$, loosely mounted on the rod $i$ and connected with and operated by the spring-motor, is provided with a series of vertically-arranged openings $b^3$, adapted to be engaged by the pin $b^2$, projecting from the flat spring $h^3$. The openings $b^3$ are so arranged in the wheel $b^4$ that when the beveled gear $a^4$ (which corresponds in size and dimensions to the gear $a^3$) has completed one revolution the said opening $b^3$ is in alinement with the pin $b^2$ and in engagement therewith.

The tube $i^4$ is slidingly and adjustably arranged, by means of the thumb-screw $i^6$, on the rod $i^5$, which latter is pointed at its lower end, as at $i^7$, and is adapted to be forced or drawn into the ground when a picture is to be taken. The lower end of the rod $i^5$ may also be provided with a folding tripod of ordinary construction, as will be manifest.

Within the casing $a$ and supported by the squared portion $i^3$ of the rod $i$ is arranged the cylindrical receptacle $m$, having the removable lid $m'$. Said lid is provided at each side of its center with a circular opening $m^7$ and connecting radial slot $m^6$, adapted to be engaged by the headed portions of the shafts $m^5$, arranged vertically within the receptacle $m$, to thus lock the lid on the said receptacle $m$.

The lid $m'$, as well as the bottom of the receptacle $m$, is provided with annular flanges $m^3$ and $m^2$, respectively, adapted to guide the film $n$ and to retain it in close contact with the said receptacle. (See Fig. 4.)

The film $n$ may be of a length equal to the periphery of the receptacle $m$, in which case the camera has to be reloaded after each exposure, or it may be a continuous film, as in Fig. 3. In the latter case the receptacle $m$ is provided with a vertically-arranged slot $m^{10}$, over the edges of which the film passes to the delivery and receiving rollers $m^8$ $m^9$, which are secured to the shafts $m^5$ and are operated in any well-known manner.

A finder $o$ is arranged on one side of the casing $a$, as clearly shown in Figs. 1 and 3.

In operation, after the camera has been adjusted to the required position, the spring-plate $h^3$ is pressed upward, thereby compressing the ball $h^2$, and thus opening the shutter $h$. The pin $b^2$, projecting from said spring-plate, simultaneously disengages the opening $b^3$ of the wheel $b^4$, and thus releases the latter and the spring-motor connected therewith. The casing $a$, carrying the funnel, lens, and shutter, is thereby rotated until the pin $b^2$ again engages the respective opening $b^3$ in the wheel $b^4$, thereby stopping the motor and simultaneously, by releasing the pressure on the ball $h^2$, closing the shutter $h$. During the rotation of the casing a complete continuous panoramic picture or negative is obtained on the film. It must be remarked that the slot $a'$ in said casing must be very narrow, as otherwise the picture will not be perfect. When the camera is provided with a continuous film, as in Fig. 3, the receiving-shaft $m^5$, after one exposure is made, is operated until the receptacle $m$ is again completely surrounded by an unused portion of the film, which can easily be determined by an indicator, such as, for instance, is used in the well-known "kodak" camera.

We do not intend to limit ourselves to the precise construction shown and described, as various alterations can be made without changing the scope of our invention; but

What we claim as new, and desire to secure by Letters Patent, is—

1. The combination with a support, of a cylindrical film-holder on said support, a cylindrical casing surrounding said film-holder and loosely mounted on said support and provided with a vertically-arranged slot, a lens-carrying funnel surrounding said slot and projecting horizontally from the casing, a shutter carried by said funnel, and means for revolving the casing, all said parts, substantially as and for the purposes described.

2. The combination with a support, of a cylindrical film-holder on said support, a cylindrical casing surrounding said film-holder and loosely mounted on said support and provided with a vertically-arranged slot, a funnel surrounding the slot and projecting horizontally from the casing, a tube projecting from said funnel, a lens-holder adjustably arranged in said tube, a shutter carried by said lens-holder, means for revolving the casing, and means for simultaneously controlling the shutter and the casing-revolving means, all said parts, substantially as and for the purposes described.

3. The combination with a support, of a cylindrical film-holder on said support, a cylindrical casing surrounding said film-holder and loosely mounted on said support and provided with a vertically-arranged slot, a lens-carrying funnel surrounding the slot and projecting horizontally from the casing, a spring-motor on the support and adapted to revolve the casing, a horizontally-arranged wheel connected with and operated by said spring-motor and provided with an opening, a pin adapted to engage said opening, a flat spring carrying said pin and secured to the casing, an elastic ball between the casing and said spring and adapted to be controlled thereby, and the pneumatic shutter carried by the funnel and controlled by said elastic ball, all said parts, substantially as and for the purposes described.

4. The combination with a support, of a cylindrical film-holder on said support, a cylindrical casing surrounding said film-holder and loosely mounted on said support and provided with a vertically-arranged slot, a lens-carrying funnel surrounding the slot and projecting from the casing, a spring-motor on the support, a horizontally-arranged shaft operated by said spring-motor, a beveled gear mounted on said shaft, a beveled gear—in engagement therewith—arranged on the casing, a wheel arranged horizontally and connected with and operated by the spring-motor and provided with an opening, a pin adapted to engage said opening, a flat spring carrying said pin and secured to the casing, a pneumatic shutter carried by the funnel, and an elastic ball controlling said shutter and arranged between the casing and the flat spring, all said parts, substantially as and for the purposes described.

In testimony that we claim the foregoing we have hereunto set our hands this 15th day of July, 1896.

EMIL PAUL SCHOENFELDER.
EMIL KEHLE.

Witnesses:
ALFRED GARTNER,
DUNCAN M. ROBERTSON.